(12) United States Patent
Artibise et al.

(10) Patent No.: US 7,488,551 B2
(45) Date of Patent: Feb. 10, 2009

(54) INTEGRATED CURRENT COLLECTOR AND ELECTRICAL COMPONENT PLATE FOR A FUEL CELL STACK

(75) Inventors: Robert H Artibise, Vancouver (CA); Frederick D McKenney, Seattle, WA (US); Joerg Zimmermann, Vancouver (CA); Steven D Gabrys, Vancouver (CA); Alexander Mossman, Vancouver (CA)

(73) Assignee: Ballard Power Systems Inc., Burnaby, British Columbia (CA)

(*) Notice: Subject to any disclaimer, the term of this patent is extended or adjusted under 35 U.S.C. 154(b) by 784 days.

(21) Appl. No.: 11/023,987

(22) Filed: Dec. 28, 2004

(65) Prior Publication Data

US 2006/0141326 A1 Jun. 29, 2006

(51) Int. Cl.
  *H01M 8/02* (2006.01)
(52) U.S. Cl. .......................... 429/38; 427/115
(58) Field of Classification Search ............... 429/38, 429/44; 427/115
  See application file for complete search history.

(56) References Cited

U.S. PATENT DOCUMENTS

| 6,541,147 | B1 | 4/2003 | McLean et al. | 429/35 |
| 6,828,053 | B2 * | 12/2004 | Fly et al. | 429/32 |
| 6,953,630 | B2 * | 10/2005 | Wells | 429/13 |
| 7,045,234 | B2 * | 5/2006 | Mardilovich et al. | 429/24 |
| 7,226,678 | B2 * | 6/2007 | Kato et al. | 429/23 |
| 2001/0036568 | A1 | 11/2001 | Farkash et al. | 429/26 |
| 2004/0131904 | A1 * | 7/2004 | Arthur et al. | 429/26 |
| 2004/0137295 | A1 * | 7/2004 | Houlberg | 429/26 |
| 2004/0224190 | A1 | 11/2004 | Sasahara et al. | 429/12 |

FOREIGN PATENT DOCUMENTS

| DE | 10151601 A1 * | 4/2003 |
| JP | 60-101881 | 6/1985 |
| JP | 08-167424 | 6/1996 |

(Continued)

OTHER PUBLICATIONS

Natarajan, D., et al., "Effect of Electrode Configuration and Electronic Conductivity on Current Density Distribution Measurements in PEM Fuel Cells," *Journal of Power Sources*, 135:95-109, 2004.

(Continued)

*Primary Examiner*—Gregg Cantelmo
(74) *Attorney, Agent, or Firm*—Seed IP Law Group PLLC

(57) ABSTRACT

An integrated current collector and electrical component plate for a fuel cell stack is disclosed, comprising a printed circuit board comprising the following layers: a current collection layer, comprising a current collector; a first insulation layer, comprising a first surface and a second surface; an electrical component layer, comprising an electrical component having a first connection site and a second connection site; and a second insulation layer, comprising a first surface and a second surface, wherein the current collection layer is laminated to the first surface of the first insulation layer, and the electrical component layer is laminated between the second surface of the first insulation layer and the first surface of the second insulation layer. A fuel cell stack and methods for manufacturing a fuel cell stack comprising the integrated current collector and electrical component plate are also disclosed.

17 Claims, 5 Drawing Sheets

FOREIGN PATENT DOCUMENTS

| | | | |
|---|---|---|---|
| JP | 2003-151606 | | 5/2003 |
| JP | 2003-272662 | | 9/2003 |
| JP | 2004171945 A | * | 6/2004 |
| WO | WO 03/085760 A2 | | 10/2003 |

OTHER PUBLICATIONS

Schmitz, A., et al., "Stability of Planar PEMFC in Printed Circuit Board Technology," *Journal of Power Sources*, 127:197-205, 2004.

* cited by examiner

INTEGRATED CURRENT COLLECTOR AND ELECTRICAL COMPONENT PLATE FOR A FUEL CELL STACK

BACKGROUND OF THE INVENTION

1. Field of the Invention

The present invention relates to electrochemical fuel cell stacks, and, more particularly, to an integrated current collector and electrical component plate for an electrochemical fuel cell stack.

2. Description of the Related Art

Electrochemical fuel cells convert reactants, namely fuel and oxidant, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area of the fuel cell.

Polymer electrolyte membrane (PEM) fuel cells generally employ a membrane electrode assembly (MEA) comprising a solid polymer electrolyte or ion-exchange membrane disposed between two electrode layers comprising a porous, electrically conductive sheet material, such as carbon fiber paper or carbon cloth, as a fluid diffusion layer. In a typical MEA, the electrode layers provide structural support to the ion-exchange membrane, which is typically thin and flexible. The membrane is ion conductive (typically proton conductive), and also acts as a barrier for isolating the reactant streams from each other. Another function of the membrane is to act as an electrical insulator between the two electrode layers. A typical commercial PEM is a sulfonated perfluorocarbon membrane sold by E.I. Du Pont de Nemours and Company under the trade designation NAFION®.

As noted above, the MEA further comprises an electrocatalyst, typically comprising finely comminuted platinum particles disposed in a layer at each membrane/electrode layer interface, to induce the desired electrochemical reactions. The electrodes are electrically coupled to provide a path for conducting electrons between the electrodes through an external load.

In a fuel cell, the MEA is typically interposed between two separator plates that are substantially impermeable to the reactant fluid streams. The plates act as current collectors and provide support for the electrodes. To control the distribution of the reactant fluid streams to the electrochemically active area, the surfaces of the plates that face the MEA may have open-faced channels formed therein. Such channels define a flow field area that generally corresponds to the adjacent electrochemically active area. Such separator plates, which have reactant channels formed therein, are commonly known as flow field plates.

In a fuel cell stack, a plurality of fuel cells are connected together, typically in series, to increase the overall output power of the assembly. In such an arrangement, one side of a given separator plate may serve as an anode plate for one cell and the other side of the plate may serve as the cathode plate for the adjacent cell. In this arrangement, the plates may be referred to as bipolar plates. The fuel cell stack is typically held together in its assembled state by tie rods and end plates. A compression mechanism is generally required to ensure sealing around internal stack manifolds and flow fields, and also to ensure adequate electrical contact between the surfaces of the plates and membrane electrode assemblies to provide the serial electrical connection among the fuel cells which make up the stack.

Typically, in fuel cell systems, current is drawn from the fuel cell stack via a pair of current collector or bus plates, typically formed of copper or coated copper, one of which is positioned at each end of the fuel cell stack between the assembled fuel cells and the end plates. In order to minimize power losses, the bus plates presently employed in fuel cell systems are typically quite thick (e.g., on the order of 2 mm for an automotive sized stack, but the thickness would be expected to vary somewhat depending on fuel cell size). However, this results in both high through-plane and in-plane thermal conductivity. A consequence of such high through-plane thermal conductivity is that heat is removed from the fuel cell stack, and a consequence of such high in-plane conductivity is that the thermal gradients within the fuel cells in the vicinity of the bus plates are decreased. Both of these consequences may lead to operating issues, such as flooding, in the fuel cells in the vicinity of the bus plates.

Prior attempts to mitigate these operating issues have primarily involved the incorporation of an additional heating component, such as an electric heater or resistive heating element, between the bus plates and end plates of a fuel cell stack (see, e.g., Japanese Patent Publication No. 8-167424, U.S. Patent Application Publication No. 2001/0036568, and U.S. Patent Application Publication No. 2004/0137295). Further additional components, such as high potential bleed down resistors and thermal and electrical insulation layers, have also been incorporated into fuel cell systems to improve performance. However, the presence of these additional components has the disadvantage of increasing the complexity of the fuel cell system design, of increasing the fuel cell system space requirements and of increasing the weight of the fuel cell system. These are significant disadvantages in mobile applications such as fuel cell powered motor vehicles.

Accordingly, although there have been advances in the field, there remains a need in the art for improved fuel cell systems generally, and, in particular, for simple, space-efficient and lightweight fuel cell systems. The present invention addresses these needs and provides further related advantages.

BRIEF SUMMARY OF THE INVENTION

In brief, the present invention is directed to an integrated current collector and electrical component plate for a fuel cell stack.

In one embodiment, the present invention provides an integrated current collector and electrical component plate for a fuel cell stack, comprising a printed circuit board comprising the following layers: (1) a current collection layer, comprising a current collector; (2) a first insulation layer, comprising a first surface and a second surface; (3) an electrical component layer, comprising an electrical component having a first connection site and a second connection site; and (4) a second insulation layer, comprising a first surface and a second surface, wherein the current collection layer is laminated to the first surface of the first insulation layer, and the electrical component layer is laminated between the second surface of the first insulation layer and the first surface of the second insulation layer. In certain embodiments, the electrical component may be a resistor.

In a further embodiment of the foregoing, the first insulation layer further comprises a first conductive via and the first connection site of the electrical component is electrically connected to the current collector by the first conductive via.

In addition, in yet further embodiments, the first insulation layer may further comprise a second conductive via, the current collection layer may further comprise a current removal region electrically isolated from the current collector, and the second connection site of the electrical component may be electrically connected to the current removal region of the current collection layer by the second conductive via of the first insulation layer.

In yet further embodiments, the current collection layer comprises one or more additional layers selected from copper, nickel and gold, the electrical component itself (e.g., a resistor) may comprise copper and/or the electrical component layer may comprise a plurality of electrical components.

Other embodiments of the present invention include fuel cell stacks comprising the aforementioned integrated current collector and electrical component plate. One such embodiment comprises: (1) an end cell; (2) an end plate; and (3) the foregoing integrated current collector and electrical component plate, wherein the integrated current collector and electrical component plate is disposed between the end cell and the end plate, the current collector is adjacent to, and in electrical contact with, the end cell, and the second surface of the second insulation layer is adjacent to the end plate. In other embodiments, the electrical component may be electrically connected in series or in parallel to the fuel cell stack.

In yet other embodiments, the present invention provides for a simple, efficient method for manufacturing a fuel cell stack comprising the aforementioned integrated current collector and electrical component plate. The method comprises fabricating the integrated current collector and electrical component plate via printed circuit board manufacturing methods, and incorporating it into the fuel cell stack. The method is useful for incorporating a cell row resistor to act as a resistive heater for heating an end cell of the fuel cell stack. Alternatively such a resistor can serve to lower voltages during open circuit or to bleed down the cell voltage during shutdown. The method is also useful for incorporating component arrays comprising a plurality of electrical components into the stack. Such arrays may be used to map physical characteristics of the fuel cell stack such as local current or temperature distributions. The electrical components may thus include shunt resistors and/or resistive thermometers.

These and other aspects of the invention will be evident upon reference to the attached figures and following detailed description.

BRIEF DESCRIPTION OF THE DRAWINGS

FIG. 3b illustrates an exploded view of the configuration of one of the shunt resistors in the array of FIG. 3a.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cell stacks, such as end plates, bus plates and supply manifolds, sensors, power generation control systems, and fuel cell systems have not been described in detail to avoid unnecessarily obscuring the descriptions of the embodiments of the invention. Unless the context requires otherwise, throughout the specification and claims which follow, the word "comprise" and variations thereof, such as "comprises" and "comprising" are to be construed in an open, inclusive sense, that is as "including but not limited to".

Figure 1:
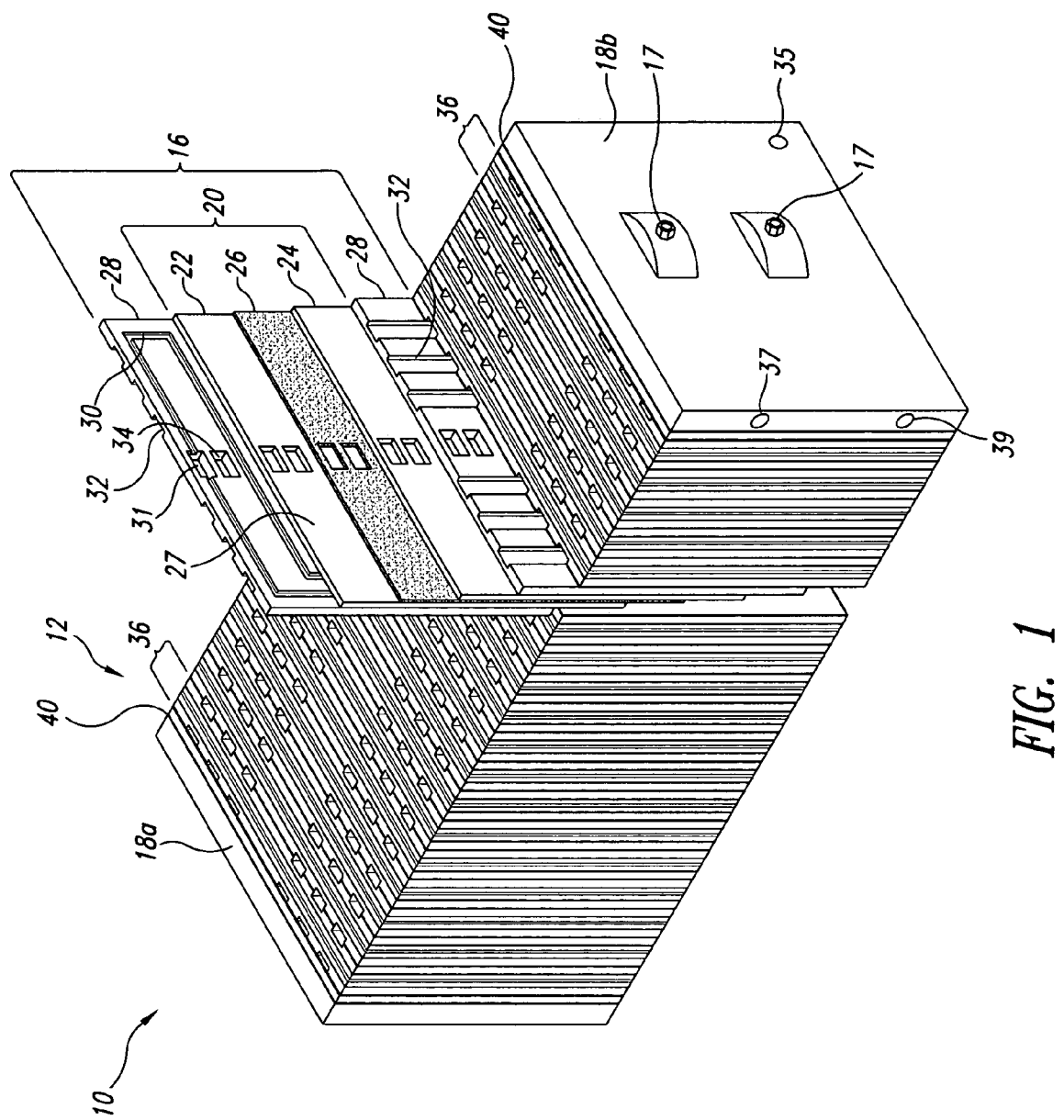
FIG. 1 illustrates a representative fuel cell stack comprising an integrated current collector and electrical component plate of the present invention.

FIG. 1 illustrates a representative electrochemical fuel cell stack 10 comprising two integrated current collector and electrical component plates 40 of the present invention. As shown, fuel cell stack 10 comprises a plurality of fuel cell assemblies 16 arranged between a pair of end plates 18a, 18b, one of the fuel cell assemblies 16 being partially removed from fuel cell stack 10 to better illustrate the structure of a representative fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 comprises a membrane electrode assembly 20 having two electrodes, namely, an anode 22 and a cathode 24, separated by an ion exchange membrane 26. Electrodes 22, 24 may be formed from a porous, electrically conductive sheet material, such as carbon fiber paper or cloth, that is permeable to the reactants. Each of electrodes 22, 24 are coated on a surface thereof adjacent to the ion exchange membrane 26 with a catalyst 27, such as a thin layer of platinum, to render each electrode electrochemically active.

Each fuel cell assembly 16 also includes a pair of separator or flow field plates 28 sandwiching the membrane electrode assembly 20. In the illustrated embodiment, each of the flow field plates 28 includes one or more reactant channels 30 formed on the planar surface of the flow field plate 28 adjacent to an associated one of the electrodes 22, 24 for carrying fuel to anode 22 and oxidant to cathode 24, respectively. Furthermore, each flow field plate 28 includes a plurality of cooling channels 32 formed on the planar surface of the flow field plate 28 opposite the planar surface having reactant channels 30. When fuel cell stack 10 is assembled, the cooling channels 32 of adjacent fuel cell assemblies 16 cooperate so that closed cooling channels 32 are formed between adjacent membrane electrode assemblies 20.

While the illustrated embodiment includes two flow field plates 28 in each fuel cell assembly 16, other embodiments can include a single bipolar flow field plate (not shown) between adjacent membrane electrode assemblies 20. In such embodiments, channels on one side of the bipolar plate carry fuel to the anode of one adjacent membrane electrode assembly 20, while channels on the other side of the plate carry oxidant to the cathode of another adjacent membrane electrode assembly 20. In such embodiments, additional flow field plates 28 having channels for carrying coolant fluid (e.g., liquid or gas, such as cooling air) can be spaced throughout fuel cell stack 10, as needed to provide sufficient cooling of fuel cell stack 10.

End plate 18a includes a fuel stream inlet port (not shown) for introducing a supply fuel stream into fuel cell stack 10. End plate 18b includes a fuel stream outlet port 35 for discharging an exhaust fuel stream from fuel cell stack 10. If desired, fuel stream outlet port 35 may be closed with a valve such that fuel cell stack 10 operates in a dead-ended mode (i.e., a mode in which substantially all of the fuel supplied during operation is consumed). Each fuel cell assembly 16 has openings formed therein to cooperate with corresponding openings in adjacent assemblies 16 to form internal fuel supply and exhaust manifolds (not shown) that extend the length of stack 10 and are fluidly connected to fuel reactant channels 30.

The end plate 18b includes an oxidant stream inlet port 37 for introducing a supply oxidant stream into fuel cell stack 10, and an oxidant stream outlet port 39 for discharging an exhaust oxidant stream from fuel cell stack 10. Each fuel cell assembly 16 has openings 31, 34, formed therein to cooperate with corresponding openings in adjacent fuel cell assemblies 16 to form oxidant supply and exhaust manifolds (not shown) that extend the length of stack 10 and are fluidly connected to oxidant reactant channels 30.

As shown in FIG. 1, fuel cell stack 10 comprises two integrated current collector and electrical component plates 40. Although not specifically shown, in the illustrated embodiment, the electrical component is a resistor. Each current collector and resistor plate 40 is disposed between an end plate 18a or 18b and the corresponding fuel cell assembly 16 located at the end of fuel cell stack 10, shown in FIG. 1 and referred to herein as an end cell 36.

Figure 2:
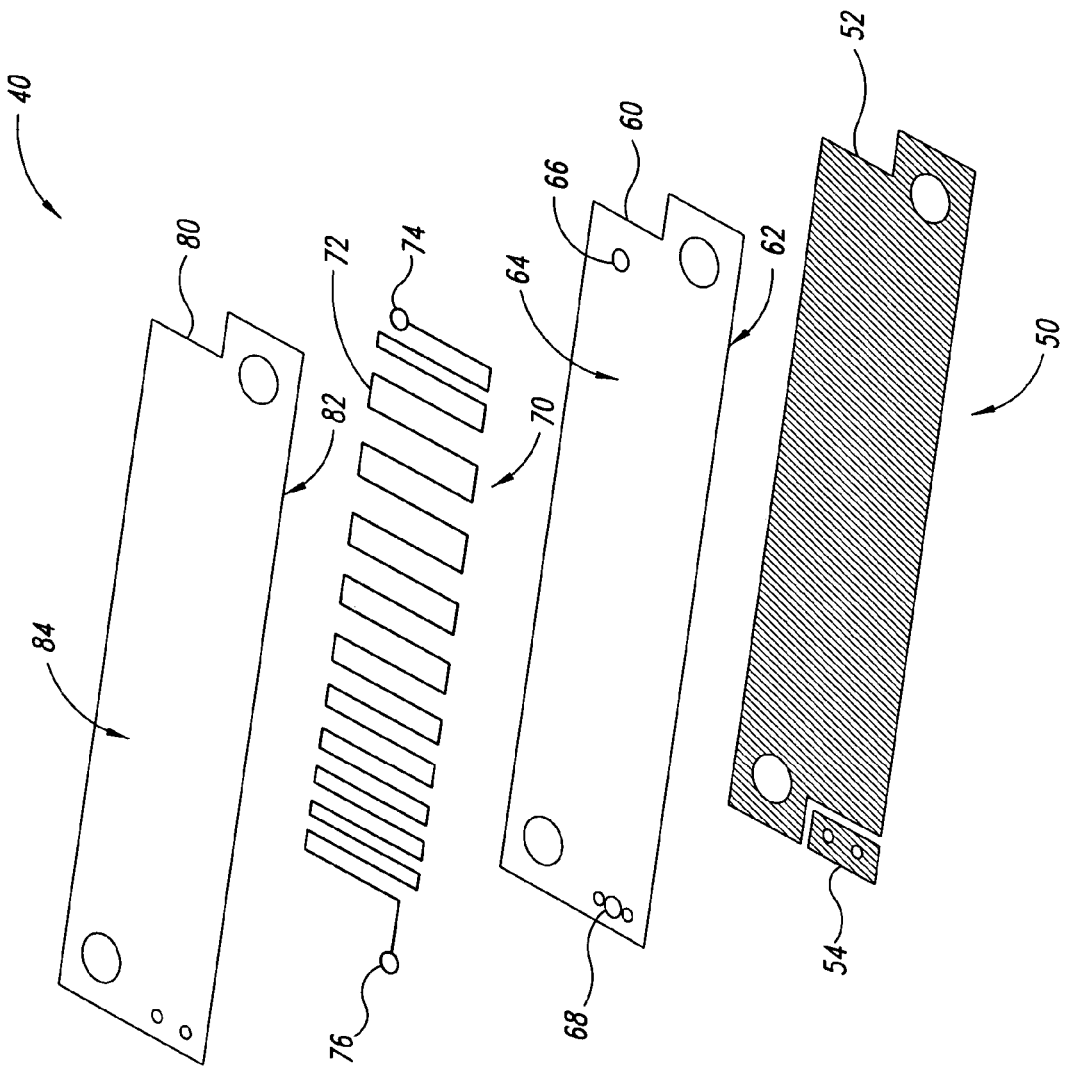
FIG. 2 illustrates an exploded view of the configuration of the representative integrated current collector and electrical component plate of FIG. 1.

FIG. 2 illustrates an exploded view of the configuration of the representative integrated current collector and resistor plate 40 of FIG. 1. As illustrated, the representative integrated current collector and resistor plate 40 comprises a printed circuit board comprising a plurality of layers, namely, an electrically conductive current collection layer 50 comprising a current collector 52, an electrically insulating first insulation layer 60, an electrical component layer 70 comprising a resistor 72, and an electrically insulating second insulation layer 80. The current collection layer 50 further comprises a current removal region 54, which is physically separated from current collector 52 within the plane of current collector layer 50 (and, therefore, electrically isolated from the current collector 52 within current collection layer 50). First insulation layer 60 comprises a first surface 62, a second surface 64, a first conductive via 66, and a second conductive via 68. Resistor 72 comprises a first connection site 74 and a second connection site 76. Second insulation layer 80 comprises a first surface 82 and a second surface 84.

When assembled, current collector layer 50 comprising current collector 52 and current removal region 54 is laminated to first surface 62 of first insulation layer 60, the electrical component layer 70 comprising resistor 72 is laminated between second surface 64 of first insulation layer 60 and first surface 82 of second insulation layer 80, and first connection site 74 of resistor 72 is electrically connected to current collector 52 by first conductive via 66 of first insulation layer 60. Furthermore, in the illustrated embodiment, second connection site 76 of resistor 72 is electrically connected to current removal region 54 by second conductive via 68 of first insulation layer 60.

As noted above, when integrated into fuel cell stack 10, integrated current collector and resistor plate 40 is disposed between an end cell 36 of the fuel cell stack and an end plate 18a or 18b of the fuel cell stack. In this way, when fuel cell stack 10 is in its compressed and assembled state, current collection layer 50 will be adjacent to, and in electrical contact with, end cell 36, and second surface 84 of second insulation layer 80 will be adjacent to the end plate 18a or 18b.

Figure 4A:
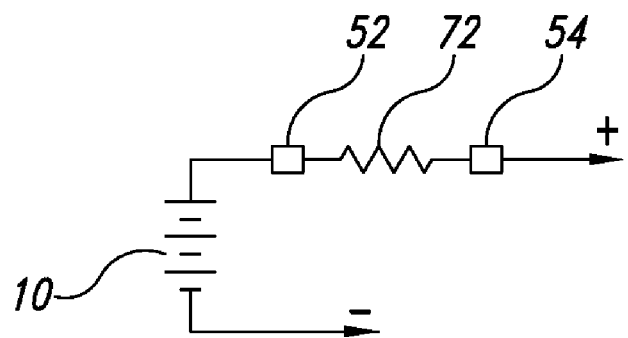
FIG. 4A is an electrical schematic diagram of an electrical component of an integrated current collector and electrical component plate connected in series to a fuel cell stack according to one embodiment.

During operation, current from fuel cell stack 10 passes (1) from current collector 52 to first connection site 74 of resistor 72 through first conductive via 66, (2) through resistor 72, and (3) from second connection site 76 to current removal region 54 through second conductive via 68. In this way, in the illustrated embodiment, resistor 72 is electrically connected in series to fuel cell stack 10. By sizing the magnitude of the resistance appropriately, heat can be provided to the adjacent end cell 36 via resistive heating from resistor 72 in accordance with the current drawn from the fuel cell stack. In such a case, it may not be necessary to use external temperature regulation systems comprising components such as sensors, controllers, power supplies and electric heaters to heat the end cell. FIG. 4A is an electrical schematic diagram of this embodiment.

Figure 4B:
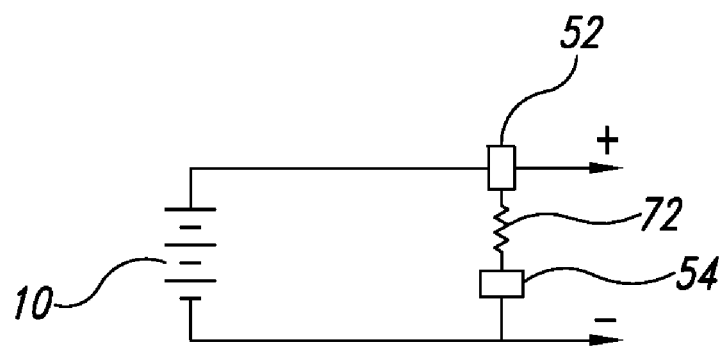
FIG. 4B is an electrical schematic diagram of an electrical component of an integrated current collector and electrical component plate connected in parallel to a fuel cell stack according to another embodiment.

In an alternative embodiment (not shown), resistor 72 may be electrically connected in parallel to the fuel cell stack instead of in series. This may be accomplished, for instance, by drawing current from a different location on current collector 52 and by electrically connecting current removal region 54 (i.e., connecting second connection site 76) to the opposite end of the stack. Such a configuration may be employed to lower the voltage of the fuel cell stack during periods of open circuit or to act as a bleed down resistor during shutdown of the fuel cell stack (i.e., resistor 72 draws a small amount of current, and, in this way, can lower the stack voltage or can "bleed" or consume excess hydrogen remaining in the fuel cell stack). FIG. 4B is an electrical schematic diagram of this embodiment.

Current collection layer 50 may comprise one or more additional layers of copper, nickel and/or gold. In an embodiment comprising each of such layers, the copper layer may be utilized to collect and distribute the bulk of the current from the fuel cell stack, and the nickel and gold layers may be utilized to ensure low electrical contact resistance when the integrated plate is exposed to corrosive conditions. For example, a nickel layer protects the copper conductive layer under a hard scratch, while a gold layer provides an oxide-free surface with low electrical contact resistance.

In a typical embodiment, resistor 72 may be made of copper. Resistor 72 may be continuous (as shown in FIG. 2) or may be formed as one or more traces. As one of ordinary skill in the art will appreciate, the resistance or heat desired will govern the thickness, length and width of resistor 72. If traces are to be used, the pitch (i.e., the number of traces per length) and/or width of the traces may be varied to provide for a specific resistance or heat dissipation in desired locations.

It has been discovered that relatively thin current collectors may be desirable for use in certain fuel cell stack applications, although a minor loss of output power may be incurred as a result. One advantage in using relatively thin current collectors is that it allows for printed circuit board designs and manufacturing techniques to be used as well. With typical printed circuit board technology, multiple components made of copper or other foils (e.g., simple resistors) may readily be fashioned on a multi-layer board. In this way, complicated patterns of conductive traces can readily be formed. In a typical manufacturing process, suitable bare laminate materials are drilled to form openings and the laminate is then electroplated with conductor (e.g., copper). The conductor is then typically masked in accordance with the desired conductive pattern and unwanted conductor is etched away (e.g., via application of suitable photo-resist, patterning using UV light, and acid etching). Additional layers (e.g., insulators), materials (e.g., solder), and/or components can then be incorporated.

The use of printed circuit board technology in the manufacture of an integrated current collector and electrical component plate as described above provides for a current collector (i.e., bus plate) which is relatively thin. While this may result in some minor power dissipation and hence loss of output power form the stack, there are advantages to having a current collector with significantly lower in-plane and through-plane thermal conductivity. Less heat is removed from the fuel cell stack as a consequence and thermal gradients within the fuel cells in the vicinity of the bus plates are decreased. This can be useful in reducing flooding in the fuel cells in the vicinity of the bus plates. In this way, the likelihood that end cells will experience performance issues is decreased. Furthermore, it provides a means of manufacturing using established and substantially more cost effective high volume circuit board manufacturing methods.

In addition, this design also provides for the integration of a current collection layer with other fuel cell components, such as electrical and thermal insulators, end cell heaters, high potential bleed down resistors and shunt resistors, into a single plate. By minimizing the number of separate components, the present invention allows for the development of easier to handle, lightweight and space-efficient fuel cell systems.

Figure 3A:
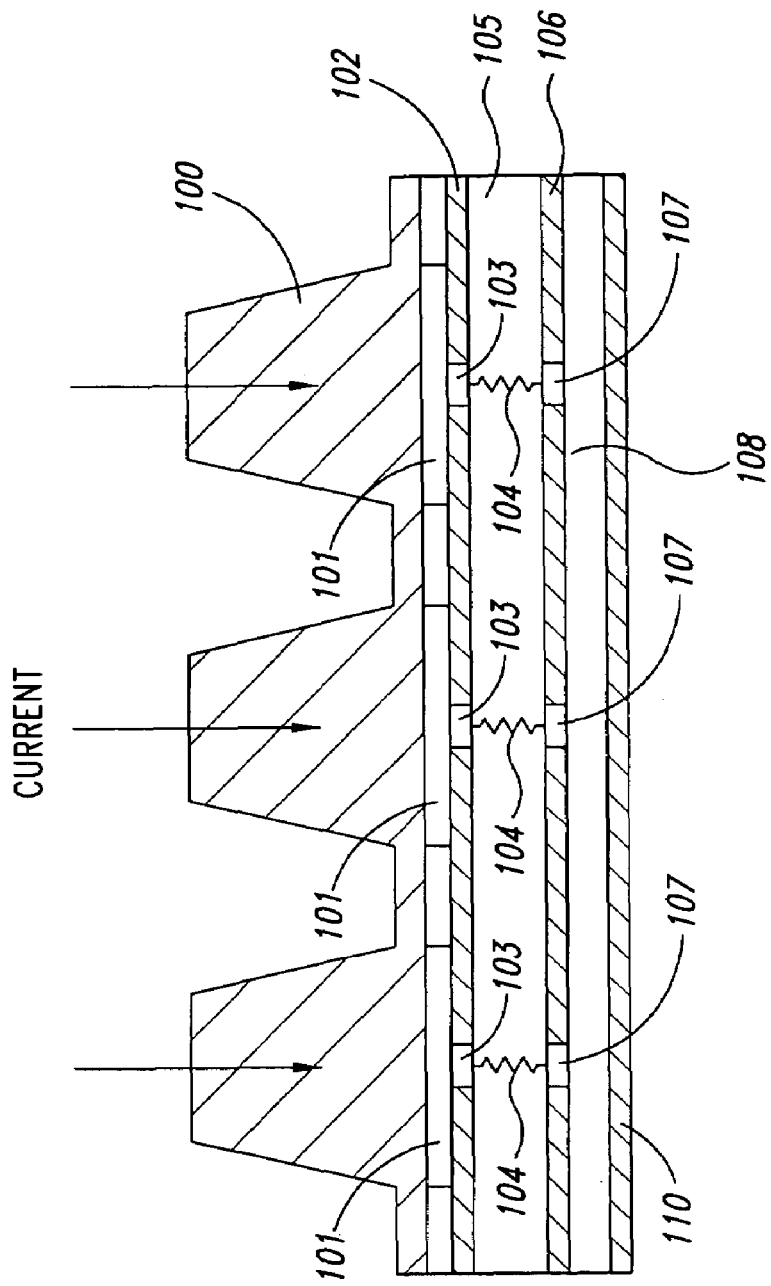
FIG. 3a illustrates a schematic of a representative integrated current collector and electrical component plate of the present invention comprising a shunt resistor array for mapping current distribution in a fuel cell stack.
Figure 3B:
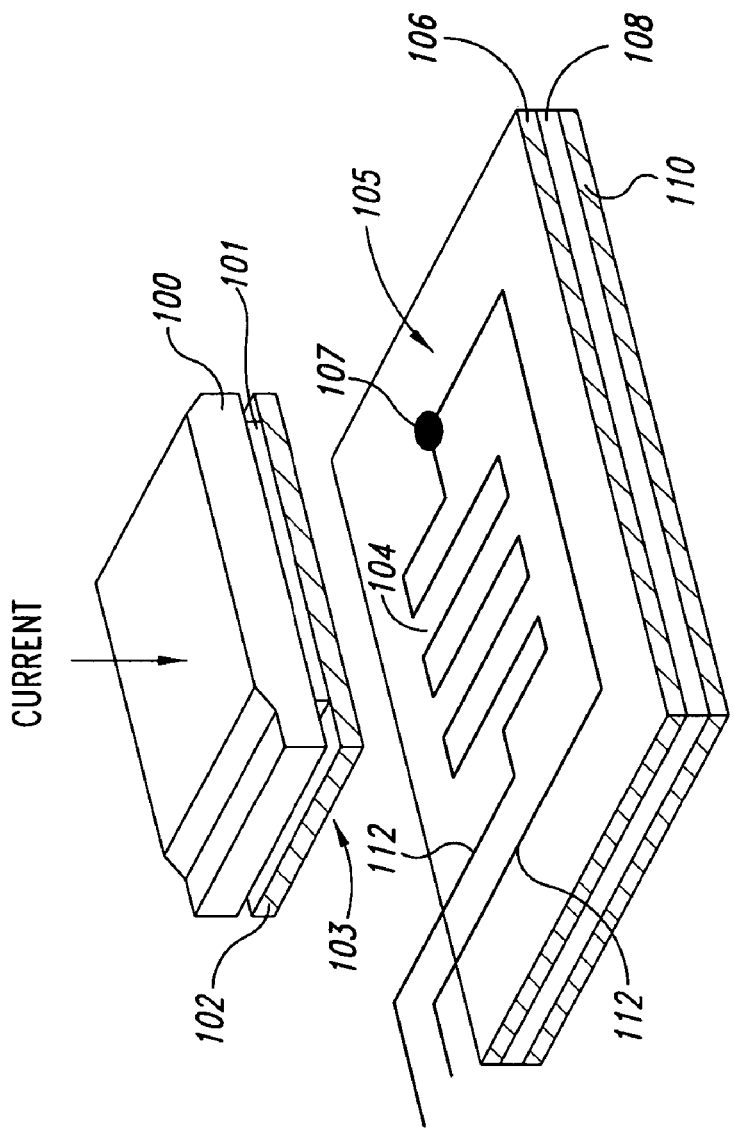

FIG. 3a shows another embodiment of the invention in which the integrated current collector and electrical component plate comprises a plurality of electrical components, (e.g., simple resistors), for purposes of mapping current distribution in a fuel cell stack. In the depicted schematic, suitably shaped copper traces are formed on the printed circuit board to form an array of shunt resistors. With reference to FIG. 3a, local currents are collected from flowfield plate 100 by local current collectors 101. The integrated current collector and shunt resistor plate comprises three electrically insulation layers 102, 106, and 110. Conductive vias 103 electrically connect local current collectors 101 to an end (i.e., first connection site) of individual shunt resistors 104 in electrical component layer 105. In a like manner, conductive vias 107 electrically connect the other ends (i.e., second connection sites) of shunt resistors 104 to current collector 108 that serves as a bus plate. If the resistance of each shunt resistor is known, the current distribution in the stack can then be mapped by measuring the voltage drops across each shunt resistor. For this purpose, pairs of copper traces (not shown in FIG. 3a) are provided on the printed circuit board to connect the ends of each shunt resistor to a suitable voltage acquisition unit. FIG. 3b illustrates an exploded view of the configuration of one of the shunt resistors in the array of FIG. 3a. FIG. 3b shows a pair of traces 112 for acquiring the voltage drop across shunt resistor 104.

In the embodiment of FIGS. 3a and 3b, the resistance of shunt resistors 104 will be a function of temperature. For instance, over the practical operating range of a typical fuel cell (e.g., 0° to 100° C.), the resistance may be expected to change of order of 10%. For some purposes, errors in measurement of this order may be accurate enough. However, for more sensitive measurements, an array of resistive thermometers may be incorporated into the integrated plate in order to measure, and hence correct for, the local temperature in the vicinity of each shunt resistor. This may be accomplished by forming an array of resistive traces (to serve as resistive thermometers) in a separate layer, that is electrically insulated from, but otherwise adjacent to the layer comprising the shunt resistor array. Via a series connected trace, a known current can be passed through each resistive thermometer. Then, in a like manner to the shunt resistor array, the voltage drop across each resistive thermometer can be acquired via pairs of voltage traces that are additionally formed in the layer. These voltage drops are indicative of the local temperature and this data can be used to correct the shunt resistor measurements. Those skilled in the art will appreciate that some power will be dissipated in the resistive thermometers. It would therefore be necessary to design the integrated plate such that this dissipated power is negligible compared to the fuel cell heat output in order to avoid perturbing the fuel cell stack.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated current collector and electrical component plate for a fuel cell stack, comprising a printed circuit board comprising the following layers:
   a current collection layer, comprising a current collector and a current removal region physically separated from the current collector;
   a first insulation layer, comprising a first surface, a second surface, a first conductive via and a second conductive via;
   an electrical component layer, comprising an electrical component having a first connection site and a second connection site; and
   a second insulation layer, comprising a first surface and a second surface,
   wherein the current collection layer is laminated to the first surface of the first insulation layer, and the electrical component layer is laminated between the second surface of the first insulation layer and the first surface of the second insulation layer,
   wherein the first connection site of the electrical component is electrically connected to the current collector by the first conductive via, and
   wherein the second connection site of the electrical component is electrically connected to the current removal region of the current collection layer by the second conductive via.

2. The integrated current collector and electrical component plate of claim 1 wherein the electrical component is a resistor.

3. The integrated current collector and electrical component plate of claim 1 wherein the current collection layer comprises one or more additional layers selected from copper, nickel and gold.

4. The integrated current collector and electrical component plate of claim 2 wherein the resistor comprises copper.

5. The integrated current collector and electrical component plate of claim 1 wherein the electrical component layer comprises a plurality of electrical components.

6. A fuel cell stack comprising:
   an end cell;
   an end plate; and
   an integrated current collector and electrical component plate, comprising a printed circuit board comprising the following layers:
      a current collection layer, comprising a current collector;
      a first insulation layer, comprising a first surface and a second surface;
      an electrical component layer, comprising an electrical component having a first connection site and a second connection site; and a second insulation layer, comprising a first surface and a second surface, wherein the current collection layer is laminated to the first surface of the first insulation layer, and the electrical component layer is laminated between the second surface of the first insulation layer and the first surface of the second insulation layer, and wherein the integrated current collector and electrical component plate is disposed between the end cell and the end plate, the current collector is adjacent to, and in electrical contact with, the end cell, and the second surface of the second insulation layer is adjacent to the end plate.

7. The fuel cell stack of claim 6 wherein the electrical component is electrically connected in series to the fuel cell stack.

8. The fuel cell stack of claim 6 wherein the electrical component is electrically connected in parallel to the fuel cell stack.

9. A method of manufacturing a fuel cell stack of claim 6 comprising:

fabricating the integrated current collector and electrical component plate via printed circuit board manufacturing methods; and incorporating the integrated current collector and electrical component plate into the fuel cell stack.

10. The method of claim 9 wherein the electrical component is a resistive heater for heating an end cell of the fuel cell stack.

11. The method of claim 9 wherein the electrical component is a resistor for lowering the voltage of the fuel cell stack during open circuit.

12. The method of claim 9 wherein the electrical component is a resistor for bleeding down the voltage of the fuel cell stack during shutdown.

13. The method of claim 9 wherein the electrical component is a shunt resistor for measuring current produced by the fuel cell stack.

14. The method of claim 9 wherein the electrical component is a resistive thermometer for measuring the temperature of the fuel cell stack.

15. The method of claim 9 wherein the integrated current collector and electrical component plate comprises a plurality of electrical components.

16. The method of claim 15 wherein the plurality of electrical components are arranged in an array for mapping a physical characteristic of the fuel cell stack.

17. The method of claim 16 wherein the physical characteristic is local current or local temperature.

\* \* \* \* \*